United States Patent [19]

Orr, Jr.

[11] 3,999,029
[45] Dec. 21, 1976

[54] FIN TO TUBE WELDING BY HIGH FREQUENCY CURRENT SOURCE

[75] Inventor: Malcom Walter Orr, Jr., Signal Mountain, Tenn.

[73] Assignee: Combustion Engineering, Inc., Windsor, Conn.

[22] Filed: June 9, 1975

[21] Appl. No.: 585,416

[52] U.S. Cl. .............................. 219/107; 219/8.5; 219/67

[51] Int. Cl.$^2$ ....................................... B23K 11/02

[58] Field of Search .............. 219/8.5, 95, 67, 107

[56] References Cited

UNITED STATES PATENTS

| | | | |
|---|---|---|---|
| 3,588,426 | 6/1971 | Harriau | 219/107 X |
| 3,758,740 | 9/1973 | Dupy | 219/67 |

Primary Examiner—J. V. Truhe
Assistant Examiner—N. D. Herkamp
Attorney, Agent, or Firm—Stephen L. Borst

[57] ABSTRACT

A method is disclosed for welding one or more fins or longitudinally extended plate like members to tubes or pipes by means of radio frequency resistance heating. A V-gap necessary for the high frequency welding technique is created by deforming the tube to produce an out of round or ovular shape. The welding is accomplished as the out of round tube or pipe is deformed back to a round shape while at the same time bringing the fin or plate like member into contact with the tube or pipe.

2 Claims, 3 Drawing Figures

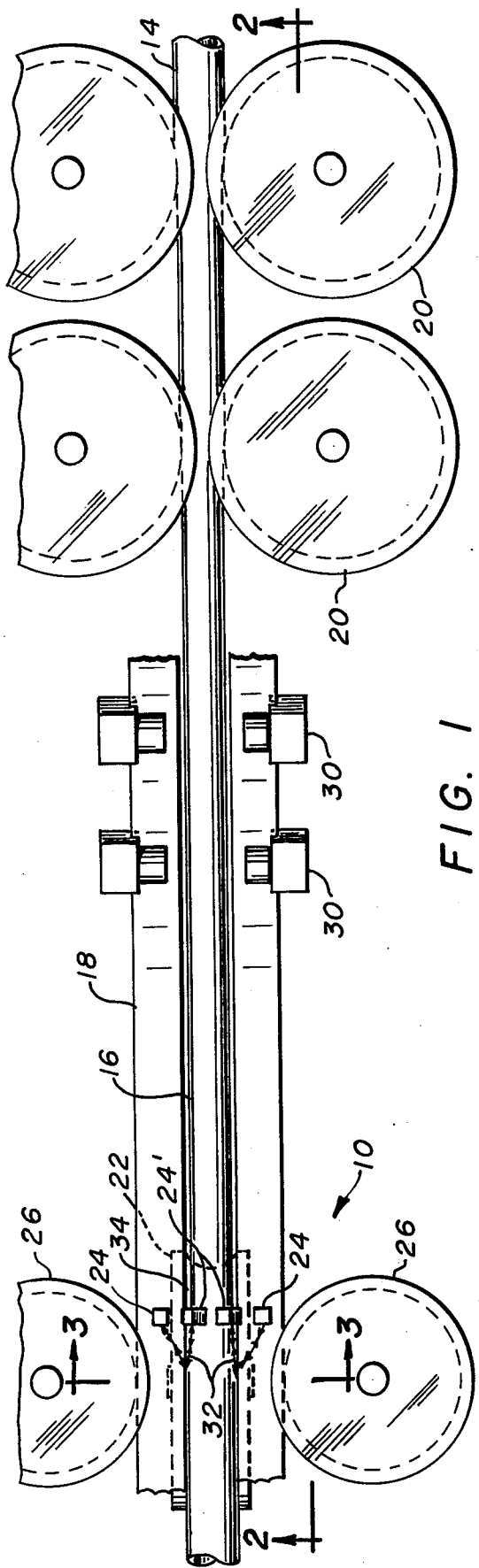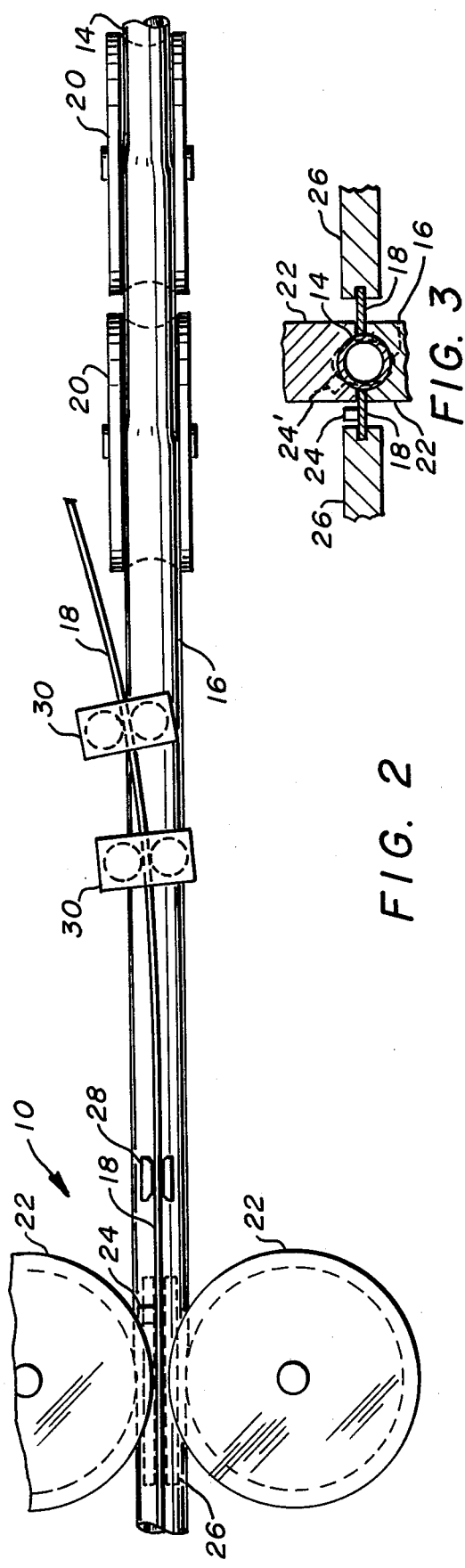

FIN TO TUBE WELDING BY HIGH FREQUENCY CURRENT SOURCE

BACKGROUND OF THE INVENTION

This invention relates to a method for welding by the use of high frequency electrical resistance heating and more particularly for the welding of more or less continuous metal strips and fins or the like to metal tubes or pipes.

It has previously been known how to weld together the edges of a longitudinal gap in metal tubing as the tubing is advanced longitudinally while applying pressure thereto to close the gap at the weld point. According to the prior art method, the heating of the gap edges is effected by the use of electrodes connected to an oscillatory current source and applied respectively adjacent to the gap edges at points positioned shortly in advance of the welding point, the current being of a frequency sufficiently high so that the lowest impedance path between the electrodes follows the gap edges to and from the weld point. It has also previously been known how to provide the welding together of metal strips and metal plates by bending one of the elements out of its plane, see U.S. Pat. No. 2,821,619 issued Jan. 28, 1958 to W. C. Rudd entitled "Continuous Welding of Strips And The Like", the disclosure of which is herein incorporated by reference.

The problem of welding a very stiff metal strip to a tube by the above mentioned techniques has posed serious difficulties since the stiffness of the metal fin is such that it becomes impractical to bend the metal fin in such a manner as to create the necessary V-shaped gap. Accordingly, the present invention proposes a technique which circumvents the practical difficulties of having to significantly deform a stiff metal plate or fin in order to weld the stiff metal plate or fin to a tube by means of high frequency electrical resistance heating.

SUMMARY OF THE INVENTION

The present application discloses both apparatus and method for facilitating the welding of stiff metal plates or fins to metal tubing. The inventive method involves slightly deforming the metal tubing to be welded so that it assumes a slightly out of round or ovular configuration by passing the tubing through ovaling rolls ahead of the welding station. Also, ahead of the welding station but after the ovaling rolls, the fin or metal plate to be welded to the tube is continuously fed into a position laterally adjacent to the flattened side of the ovaled tube. The ovaled tube and the metal fin or plate are advanced in this configuration at the same rate of speed towards the welding station. Sliding high frequency electrical power contacts are brought into contact with both the advancing ovaled tube and the metal fin or plate slightly in advance of the welding point. Rounding rolls or drawing dies are provided adjacent to the welding point to bring the ovaled tube back into round. Also at the welding point, means are provided to hold the metal fin or the plate so that the rerounding of the tubes brings the tubes and the fin or plate into close physical contact at the weld point, thereby providing the necessary welding force. By means of such a method and apparatus the V-shaped gap necessary for high frequency electrical welding is formed and the weld is made without having to significantly deform the stiff metal strip, fin or plate.

BRIEF DESCRIPTION OF THE DRAWINGS

FIG. 1 is a plan view of the apparatus of the present invention showing tube ovaling rolls and the welding station.

FIG. 2 is a side view of FIG. 1 along lines 2—2.

FIG. 3 is a sectional view of FIG. 1 along lines 3—3.

DESCRIPTION OF THE PREFERRED EMBODIMENT

Referring to the drawings in FIG. 1, a first elongated member or a metal tube 14 is shown, to which is to be welded a second member of metal strip or fin 18. Both the tube 14 and the metal fin 18 are advanced in close, but not touching, adjacent relationship to the left at a uniform rate by any suitable mechanical means (not shown). Welding station 10 is provided at which the fins 18 are welded to the tube 14 at welding point 32. The prior art techniques of high frequency electrical resistance heating are utilized to provide the heat necessary to cause the weld at welding point 32. Sliding contacts or electrodes 24 and 24' are maintained in sliding contact with the advancing tube 14 and the fins 18 in advance of the welding point 32 so that the high frequency oscillating current is passed along the surface of the materials and through welding point 32. Contacts 24, 24' are connected to a state of the art high frequency oscillating current source (not shown).

In order to provide a V-shaped gap 34 for the proper control of the flow of the high frequency current in advance of the weld point 32, it is necessary to bring the tube and the fin together at a slight angle. This is accomplished by first deforming the advancing tube 14 from a round cross-section to an ovular cross-section by ovaling rollers 20 to produce an ovular section of tube 16 in the tube 14, and then returning the tube to a round cross-section at the welding point 32 by means of rerounding rollers 22. Accordingly, rerounding rollers 22 act to increase the dimension of the tube in the direction of the fin at the welding point 32. In order to assure that a good weld is formed at welding point 32, the fins 18 are held by rollers 26 providing a firm contact with the tube 14 at the weld point 32. As best seen in FIG. 2, fins 18 are moved into a line parallel with the axis of the tube 14 by guiding rollers 30 and guiding means 28. By such means, the stiff metal fin 18 can be deflected in minor degree to avoid interference from ovaling rollers 20.

In another embodiment, the tube to be welded may be deformed only once. In such an embodiment, the final product is a fin or plate welded to an oval tube. Thus, a round tube and a fin may be fed to the welding station in close, but not touching, adjacent relationship. The fin and the tube are brought into contact by increasing one dimension of the tube in the direction of the fin. This dimension increase may be accomplished by ovaling the tube right at the weld point 32 by rollers 22. In this embodiment, the function of rollers 22 would be to force the tube to an out-of-round or oval configuration rather than bringing the tube back into round as previously disclosed. Alternatively, the original tube stock might be oval. In such a case, the tube would be fed to the welding station 10 with its "flat" side facing the fin to which it is to be welded. The rollers 22 would then be rerounding rollers, and the step of increasing one dimension of the tube in the direction of the fin would constitute changing the tube's cross-section from ovular to round so that the final product would be a round tube welded to a fin.

What is claimed is:

1. A method for welding an elongated member to a tube along a line by means of resistance heating caused by a high frequency oscillatory current source, wherein the method comprising the steps of:
    a. ovaling said tube by flattening said tube in one direction without altering the thickness of the tube wall;
    b. uniformly moving said elongated member and said ovaled tube into close, but not touching adjacent relationship such that said elongated member is adjacent to the flattened side of said ovaled tube;
    c. causing said elongated member and said tube to come together at a weld point by rerounding said ovaled tube by increasing the cross-sectional dimension of said ovaled tube in the direction of said elongated member, thereby maintaining a narrow generally V-shaped gap in advance of said weld point, said V-shaped gap terminating at said weld point; and
    d. heating said tube and said elongated member in advance of said weld point by applying first and second contacts to said tube and said elongated member respectively at points in advance of said weld point, said first and second contacts each being connected to a high frequency oscillating current source.

2. An apparatus for welding an elongated member to a tube along a line by means of resistance heating caused by a high frequency oscillatory current source, wherein said apparatus comprising:
    a. a high frequency oscillatory current source welding station including first and second sliding contacts for contacting said tube and said elongated member respectively;
    b. means for deforming said tube to an oval cross-section;
    c. means for uniformly feeding said elongated member and said ovaled tube in close, but not touching, adjacent relationship to said welding station; and
    d. means located at said welding station for forcing said tube and said elongated member to come together at a weld point by increasing the cross-sectional dimension of said tube in the direction of said elongated member by rerounding said tube.

* * * * *